(12) United States Patent
Johnson et al.

(10) Patent No.: US 10,893,065 B2
(45) Date of Patent: Jan. 12, 2021

(54) MALWARE DETECTION IN DISTRIBUTED COMPUTER SYSTEMS

(71) Applicant: TEACHERS INSURANCE AND ANNUITY ASSOCIATION OF AMERICA, New York, NY (US)

(72) Inventors: Eric J. Johnson, Waxhaw, NC (US); Christopher R. Henson, Broomfield, CO (US); Xin Ai, Matthews, NC (US); Evan Stewart Morgan, Huntersville, NC (US); Stephen Ward, Westfield, NJ (US)

(73) Assignee: Teachers Insurance and Annuity Association of America, New York, NY (US)

( * ) Notice: Subject to any disclaimer, the term of this patent is extended or adjusted under 35 U.S.C. 154(b) by 0 days.

(21) Appl. No.: 16/736,295

(22) Filed: Jan. 7, 2020

(65) Prior Publication Data

US 2020/0145445 A1    May 7, 2020

Related U.S. Application Data

(63) Continuation of application No. 15/593,980, filed on May 12, 2017, now Pat. No. 10,574,680.

(51) Int. Cl.
*H04L 29/06* (2006.01)

(52) U.S. Cl.
CPC ...... *H04L 63/1425* (2013.01); *H04L 63/0236* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 7,107,202 B1* | 9/2006 | Hegde | ...... | G06F 30/33 703/22 |
| 8,391,834 B2‡ | 3/2013 | Raleigh | ...... | G06F 21/53 455/407 |
| 8,606,911 B2‡ | 12/2013 | Raleigh | ...... | H04L 12/14 709/224 |
| 8,893,009 B2‡ | 11/2014 | Raleigh | ...... | H04M 15/00 715/736 |

(Continued)

OTHER PUBLICATIONS

Yang, Xiaowei et al. TVA: A DoS-Limiting Network Architecture. IEEE/ACM Transactions on Networking vol. 16, Issue: 6. https://ieeexplore.ieee.org/stamp/stamp.jsp?tp=&arnumber=4470205 (Year: 2008).*

(Continued)

*Primary Examiner* — Jeremiah L Avery
(74) *Attorney, Agent, or Firm* — Lowenstein Sandler LLP (57) ABSTRACT

Methods and systems of malware detection in distributed computer systems. An example method includes: receiving, by a network router, a network packet originated by a client computer; matching the network packet to a default route; forwarding the network packet to a command and control server simulator; and forwarding, to the client computer system, one or more response packets comprising a command and control instruction issued to the client computer system by the command and control server simulator.

20 Claims, 4 Drawing Sheets

```
                              ┌─300

┌─────────────────────────────────────┐
    │ 310 Receive network packet originated│
    │        by client computer system     │
    └─────────────────────────────────────┘
                     │
    ┌─────────────────────────────────────┐
    │ 320 Match network packet to default │
    │               route                  │
    └─────────────────────────────────────┘
                     │
    ┌─────────────────────────────────────┐
    │    330 Forward network packet to    │
    │ command and control server simulator│
    └─────────────────────────────────────┘
                     │
    ┌─────────────────────────────────────┐
    │     340 Forward response packets    │
    │        to client computer system    │
    └─────────────────────────────────────┘
```

(56) References Cited

U.S. PATENT DOCUMENTS

| | | | | |
|---|---|---|---|---|
| 9,021,092 | B2* | 4/2015 | Silva | H04L 63/1425 709/224 |
| 9,615,192 | B2* | 4/2017 | Raleigh | G06Q 40/12 |
| 10,129,289 | B1‡ | 11/2018 | Yang | H04L 63/1441 |
| 2007/0244987 | A1‡ | 10/2007 | Pedersen | H04L 67/06 709/217 |
| 2008/0046993 | A1* | 2/2008 | Mullick | H04L 63/20 726/15 |
| 2008/0072311 | A1‡ | 3/2008 | Mullick | H04L 63/0272 726/15 |
| 2009/0106571 | A1‡ | 4/2009 | Low | G06F 9/4856 713/310 |
| 2012/0079594 | A1‡ | 3/2012 | Jeong | G06F 21/57 726/23 |
| 2013/0031191 | A1* | 1/2013 | Bott | H04W 12/0027 709/206 |
| 2014/0344891 | A1‡ | 11/2014 | Mullick | H04L 63/0272 726/1 |
| 2015/0082399 | A1‡ | 3/2015 | Wu | G06F 21/6209 726/6 |
| 2015/0372980 | A1‡ | 12/2015 | Eyada | H04L 63/1441 726/1 |
| 2018/0234298 | A1‡ | 8/2018 | Cohn | H04L 41/12 |

OTHER PUBLICATIONS

Lee, Jeongcheol et al. Consecutive geographic multicasting protocol in large-scale wireless sensor networks. 21st Annual IEEE International Symposium on Personal, Indoor and Mobile Radio Communications. https://ieeexplore.ieee.org/stamp/stamp.jsp?tp=&arnumber=5671674 (Year: 2010).*

Red Team Operations, Test the Efficacy Of Your Security Staff, Processes and Technology, https://www.fireeye.com/content/dam/fireeye-www/services/pdfs/pf/ms/ds-red-team-operations.pdf, 2 pages.‡

Wiki GitHub, IntroductionToSecurityOnion, https://github.com/Security-Onion-Solutions/security-onion/wiki/IntroductionToSecurityOnion, 3 pages.‡

Haas, R. et al. Automatic service deployment in networks. IBM Systems Journal, vol. 42, Issue: 1. https://ieeexplore.ieee.org/stamp/stamp.jsp?tp=&arnumber=5386836 (Year: 2003).‡

Liu, Hong et al. Shared Authority Based Privacy-Preserving Authentication Protocol in Cloud Computing. IEEE Transactions on Parallel and Distributed Systems, vol. 26, Issue: 1. https://ieeexplore.ieee.org/stamp/stamp.jsp?tp=&arnumber=6748054 (Year: 2015).‡

Haas, R. et al. Automatic service deployment in networks, IBM Systems Journal, vol. 42, Issue: 1, https:://ieeexplore.ieee.org/stamp/stamp.jsp?tp=&amumber=5386836 (Year: 2003).

Liu, Hong et al. Shared Authority Based Privacy-Preserving Authentication Protocol in Cloud Computing. IEEE Transactions on Parallel and Distributed Systems, vol. 26, Issue: 1, https://ieeexplore.ieee.org/stamps/stamp.jsp?1p=&arnumber=6748054 (Year: 2015).

Wiki GitHub, IntroductionToSecurityOnion, https://gitbhub.com/Security-Onion-Solutions/security-onion/wiki/IntroductionToSecurityOnion, 3 pages Pub. Date: 2017.

Red Team Operations, Test The Efficacy Of Your Security Staff, Processes and Technology, https://www.fireeye.com/content/dam/fireeye-www/services/pdfs/pf/ms/ds-red-team-operations.pdf, 2 pages Pub. Date: 2016.

USPTO, Office Action for U.S. Appl. No. 15/593,980, dated Dec. 21, 2018.

USPTO, Final Office Action for U.S. Appl. No. 15/593,980, dated Jul. 9, 2019.

USPTO, Notice of Allowance for U.S. Appl. No. 15/593,980, dated Oct. 18, 2019.

\* cited by examiner
‡ imported from a related application

FIG. 4

MALWARE DETECTION IN DISTRIBUTED COMPUTER SYSTEMS

RELATED APPLICATIONS

This application is a continuation of U.S. patent application Ser. No. 15/593,980 filed on May 12, 2017, the entire content of which is incorporated by reference herein.

TECHNICAL FIELD

The present disclosure is generally related to distributed computer systems, and is more specifically related to methods and systems of malware detection in distributed computer systems.

BACKGROUND

A malware agent running on an affected computer system may attempt to communicate to its command and control (C2) server to receive instructions and upload the data collected on the affected computer system and the affected network. Various methods may be employed for detecting and preventing malware activity.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems of malware detection in distributed computer systems. In an illustrative example, a distributed computer system may be represented by an enterprise network that includes client computers, web servers, application servers, database servers, and/or various other components residing in one or more physical locations and interconnected by one or more physical and/or virtual networks.

In the below description and examples, references are made to Open Systems Interconnection (OSI) model layers, including network layer (layer 3), transport layer (layer 4), and session layer (layer 5) as defined by Recommendation X.200 (07/94) by International Telecommunications Union (ITU). The network layer provides the functional and procedural means of transferring variable-length data sequences from a source to a destination host via one or more networks, while maintaining the quality of service functions. Functions of network layer protocols include host addressing and message forwarding. The transport layer provides the functional and procedural means of transferring variable-length data sequences from a source to a destination host via one or more networks, while maintaining the quality of service functions. An example of a transport-layer protocol in the standard Internet stack is Transmission Control Protocol (TCP). The session layer establishes, manages and terminates network connections. Some functions of the session layer are implemented by TCP, while other functions of the session layer may be implemented by applications.

A computer system (e.g., a client computer system running a web browser) may, due to inadvertent user actions, download and install a malware agent. Appearing in various forms and shapes, most malware agents comprise executable code which, once activated, would attempt to communicate to an associated command and control (C2) server. The domain name or Internet Protocol (IP) address of the C2 server may be hardcoded in the malware agent. The outbound communications by a malware agent to the C2C server are referred to as "callbacks" herein. Upon completing a handshake and establishing a communication session (e.g., a TCP connection, an HTTP session, or the like) to the C2 server, the malware agent may receive instructions from the C2 server and upload the data that has been collected on the local machine and/or the local network. This may lead to compromising the data confidentiality and integrity not only on the local machine, but also within the enterprise network.

In certain implementations, protecting the enterprise network may involve routing all proxy-compatible Internet-bound traffic (i.e., traffic that is addressed to destinations outside of the enterprise network) through a transparent client-side proxy server. The proxy server may perform whitelisting or blacklisting of destination hosts and/or stateful inspection of the network packets that are leaving or entering the enterprise network. Proxy-compatible traffic includes, e.g., HyperText Transfer Protocol (HTTP), File Transfer Protocol (FTP) and/or other application-layer protocols. All other (i.e., proxy-incompatible) Internet-bound traffic, also referred to as "default route" traffic, may be disallowed, e.g., by configuring the gateway to silently discard the network packets that are leaving or entering the enterprise network, unless such packets should be routed through the above-referenced proxy or unless such packets are addressed to or originated from known ("whitelisted") hosts.

While the above-described approach may be reasonably effective for preventing a malware agent residing on the enterprise network from communicating to a C2 server, various portable computers (e.g., notebooks, wireless terminals, smartphones and/or other similar devices), which may be employed to store confidential data, may still be vulnerable to the malware activity, since a portable device may occasionally connect to public and/or unsecure non-public networks. In an illustrative example, a malware agent residing on an affected portable computer system may attempt to communicate to the C2 server while the portable computer system is connected to a public and/or an unsecure non-public network. In the absence of the above-described traffic filtering devices, such communication may succeed, resulting in the affected portable computer receiving instructions and/or uploading data to the C2 server.

The systems and methods of the present disclosure overcome the above-noted and other deficiencies of common malware protecting methods by routing all "default route" traffic to a C2 server simulator (also referred to as "high interaction honeypot") and/or intrusion detection and prevention system, as described in more detail herein below.

"Default route traffic" herein shall refer to network packets that are leaving the enterprise network, unless such packets should be routed through the above-referenced proxy or unless such packets are addressed to known "whitelisted" hosts.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
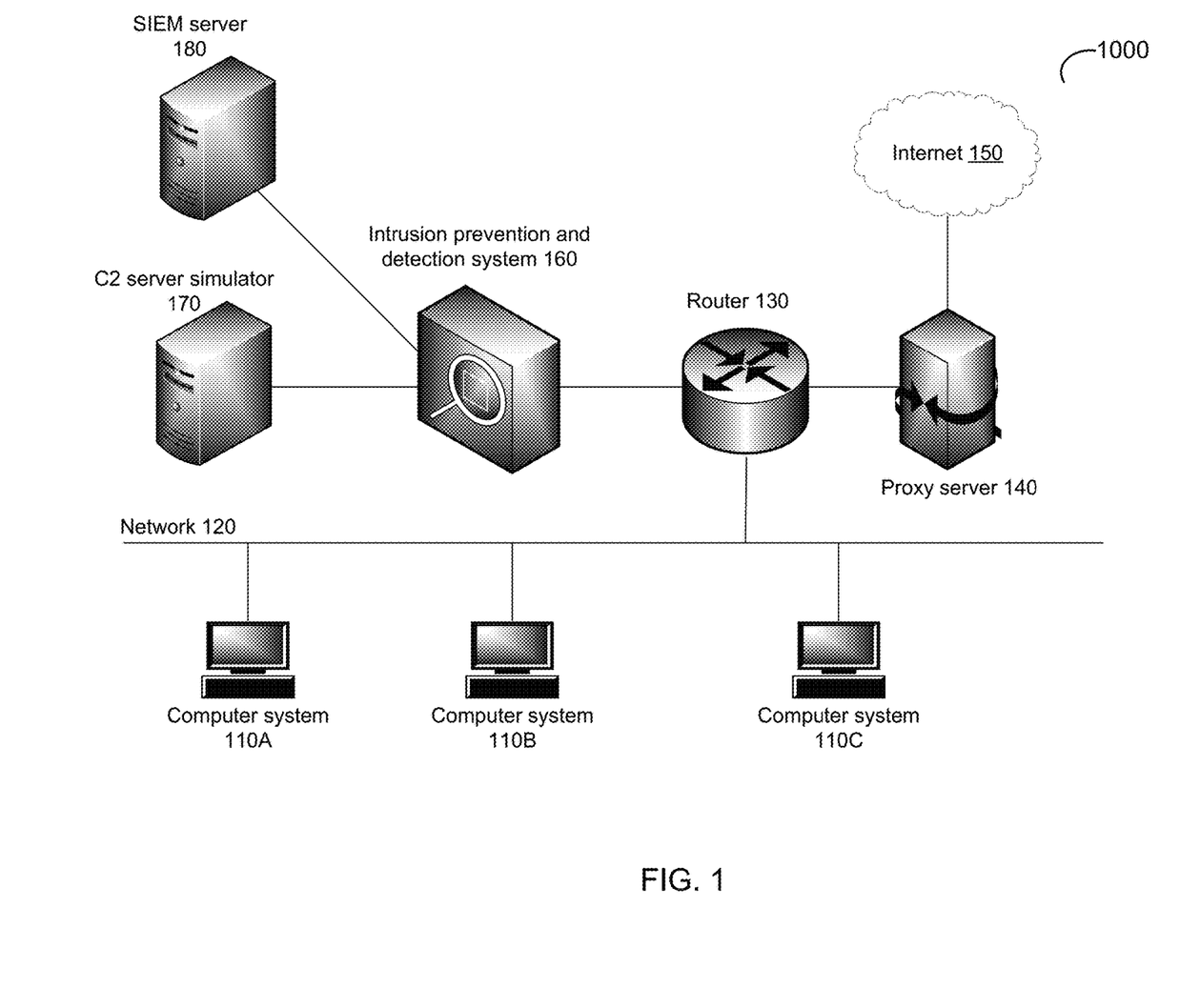
FIG. 1 schematically illustrates a high-level network diagram of an example distributed computer system operating in accordance with one or more aspects of the present disclosure.

FIG. 1 schematically illustrates a high-level network diagram of an example distributed computer system 1000 operating in accordance with one or more aspects of the present disclosure. Computer systems, appliances, and network segments are shown in FIG. 1 for illustrative purposes only and do not in any way limit the scope of the present disclosure. Routers, firewalls, load balancers, network switches and various other components may be omitted from FIG. 1 for clarity. Various other computer systems, components, appliances, and/or methods of their interconnection may be compatible with the methods and systems described herein.

In an illustrative example, the distributed computer system 1000 may comprise one or more computer systems 110A-110Z, which may be interconnected by one or more networks 120. Networks 120 may comprise one or more virtual or physical networks, including local area networks and/or wide area networks. Computer systems 110 may be represented by various types of servers (e.g., HTTP servers, application servers, database servers, etc.) or client computers (e.g., desktop or portable computers running web browsers and/or other applications). While FIG. 1 shows a simplistic network topology in which all computer systems 110 are connected to a single network segment, various other network topologies fall within the scope of the present disclosure. In an illustrative example, computer systems 100 may be interconnected by a multi-tiered network with filtering routers employed to route network packets between the tiers.

In certain implementations, the distributed computer system 1000 may comprise one or more routers 130 employed to handle the Internet-bound traffic (i.e., traffic that is addressed to destinations outside of the enterprise network). While FIG. 1 illustrates a single instance of the router 130, multiple instances of the router 130 may be employed by the distributed computer system 1000, e.g., in order to satisfy certain availability and/or throughput requirements.

The router 130 may be configured to forward all proxy-compatible Internet-bound traffic to a proxy server 140, which may be connected to the Internet 150. Proxy-compatible traffic includes, e.g., HyperText Transfer Protocol (HTTP), File Transfer Protocol (FTP) and/or other application-layer protocols. While FIG. 1 illustrates a single instance of the proxy server 140, multiple instances of the proxy server 140 may be employed by the distributed computer system 1000, e.g., in order to satisfy certain availability and/or throughput requirements.

In certain implementations, the router 130 may enforce whitelisting or blacklisting of destination hosts. Whitelisting involves only forwarding to the proxy server 140 the network packets that are addressed to a host referenced by a list of allowed destinations ("white list"). Blacklisting involves forwarding to the proxy server 140 the network packets that are addressed to any host other than the hosts specified by a list of prohibited destinations ("black list").

In an illustrative example, the proxy server 140 may be represented by a Socket Secure (SOCKS) server, which is a general purpose proxy server operating at layer 5 (session layer) of the OSI model. The SOCKS server may establish a TCP connection to the destination server (not shown in FIG. 1) on behalf of a client computer system 110, and then route all the traffic back and forth between the client and the server. Since the SOCKS server is agnostic with respect to the higher-layer protocols, it may be employed for supporting a wide range of application-layer protocols, including HTTP, FTP, and/or custom protocols.

In another illustrative example, the proxy server 140 may be represented by an HTTP proxy, which may inspect and/or modify HTTP requests and responses flowing between HTTP clients and HTTP servers. In various implementations, the HTTP proxy may rewrite certain HTTP headers, cache HTTP server responses, and/or perform other actions based on stateful inspection of network packets.

In certain implementations, the return (inbound) traffic (i.e., network packets originated by hosts residing outside of the enterprise network in response to requests transmitted by hosts residing on the enterprise network) may follow the same path as the outbound traffic. Alternatively, the return traffic may bypass the proxy server 140.

As noted herein above, the router 130 may forward the "default route" traffic to an intrusion prevention and detection system 160 and/or a C2 server simulator 170. In certain implementations, if the destination whitelisting is supported by the router 130, the traffic forwarded to the intrusion prevention and detection system 160 and/or to the C2 server simulator 170 may include all proxy-incompatible traffic as well as proxy-compatible traffic addressed to non-whitelisted hosts. Alternatively, if the destination blacklisting is supported by the router 130, the traffic forwarded to the intrusion prevention and detection system 160 and/or to the C2 server simulator 170 may include all proxy-incompatible traffic as well as proxy-compatible traffic addressed to the blacklisted hosts.

In the illustrative example of FIG. 1, the Internet-bound traffic is forwarded to both the intrusion prevention and detection system 160 and the C2 server simulator 170. Alternatively, the Internet-bound traffic may be forwarded to the C2 server simulator 170 only.

The intrusion prevention and detection system 160 may analyze the received network traffic in order to detect malicious activity, such as malware agent communications with C2 servers. In an illustrative example, the intrusion prevention and detection system 160 may implement signature-based detection methods that involve stateful inspection of network packets and matching the network packets to known malware activity patterns (also referred to as "callback signatures") and/or benign activity patterns.

In another illustrative example, the intrusion prevention and detection system 160 may implement statistical detection methods. In an illustrative example, the intrusion prevention and detection system 160 may monitor various parameters of the network traffic and compare the observed values against an established baseline (e.g., distribution of values of certain parameters, range of values of certain parameters, etc.) that corresponds to known malware activity patterns and/or benign activity patterns. The network traffic parameters to be observed may include application layer protocols and protocol-specific parameters, source and destination addresses and port numbers, packet time-to-live values, and/or other traffic parameters in various combinations.

Responsive to detecting malicious activity, such as malware agent communications with C2 servers, the intrusion prevention and detection system 160 may log the network address and other identifying information of the detected malware agent and/or the network address and other identifying information of the C2 server that was the intended recipient of the callback message originated by the malware agent. The intrusion prevention and detection system 160 may further log other parameters of the detected malicious activity. In certain implementations, the logs and alerts generated by the intrusion prevention and detection system 160 may be transmitted to the Security Information and Event Management (SIEM) server 180 for further analysis.

The C2 server simulator 170 may, as its name suggest, mimic the functionality of a C2 server, by responding to callback requests transmitted by malware agents running on computer systems residing on the enterprise network. In an illustrative example, responsive to receiving a callback request initiated by a malware agent residing on a computer system 110, the C2 server simulator 170 may identify the type of the malware agent by matching the request to known callback signatures. Responsive to identifying the type of the malware agent, the C2 server simulator 170 may formulate and transmit a response to the callback request. The C2 server simulator 170 or the router 130 may rewrite the source address field of the response packets to match the destination address of the callback request (i.e., the address of the C2 server). Since the response is built to match the handshake protocol of the identified malware agent type, the malware agent would be led to believe that it is communicating to its C2 server and would thus transmit the collected data and/or request further instructions from the C2 server.

Responsive to detecting the malware agent activity, the C2 server simulator 170 may log the network address and other identifying information of the detected malware agent and/or the network address and other identifying information of the C2 server that was the intended recipient of the callback message originated by the malware agent. The C2 server simulator 170 may further log other parameters of the detected malicious activity. In certain implementations, the logs and alerts generated by the C2 server simulator 170 may be transmitted to the SIEM server 180 for further analysis.

In certain implementations, in response to analyzing one or more logs or alerts originated by the intrusion prevention and detection system 160 and/or the C2 server simulator 170, a configuration management component of the enterprise network may reconfigure one or more instances of the router 130 by creating routing rules causing the router to discard subsequent network packets originated by the host on which the detected malware agent operates, network packets originated by any host on the enterprise network and addressed to the detected malware C2 server, and/or network packets originated by the detected malware C2 server.

Figure 2:
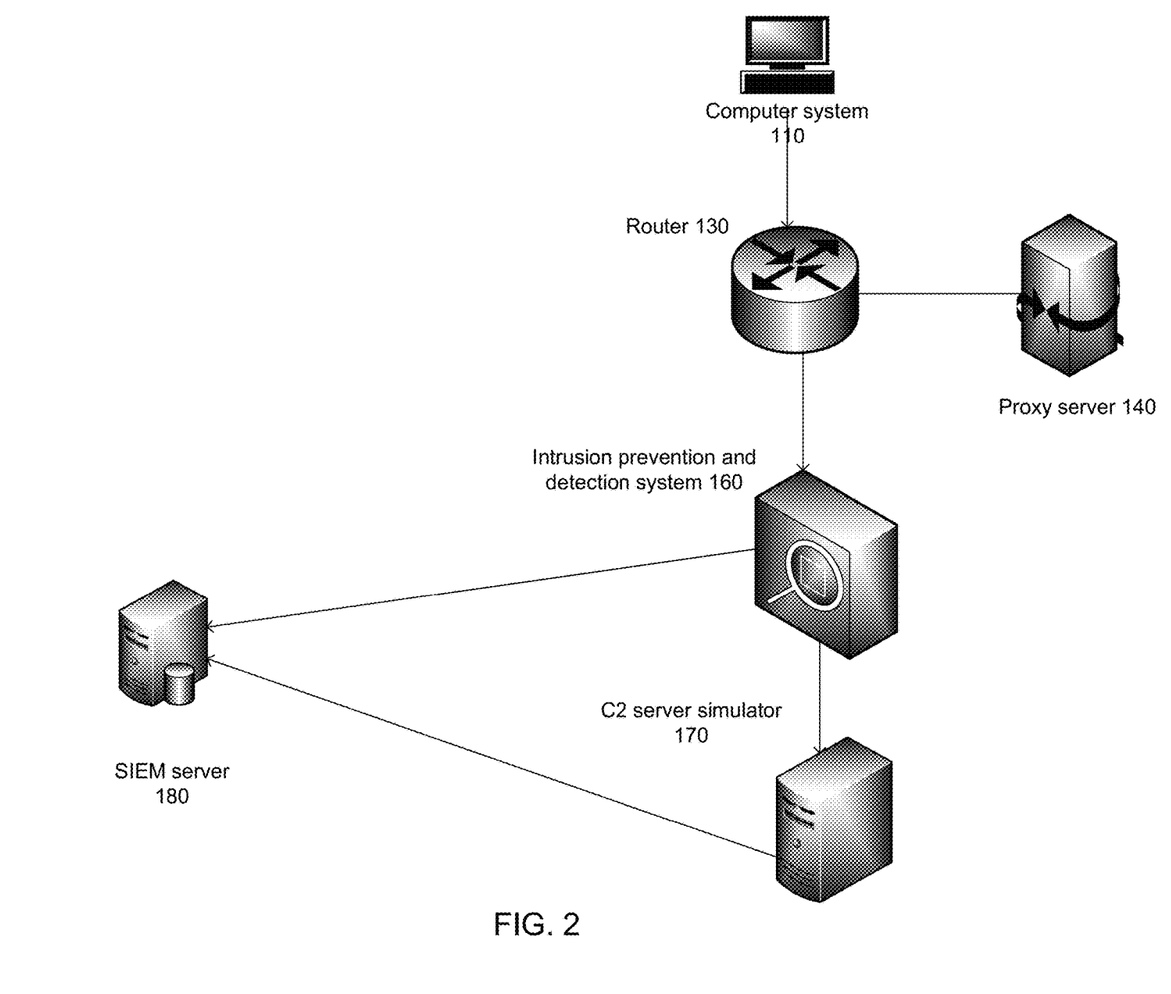
FIG. 2 schematically illustrates various flows of network traffic in an enterprise network, in accordance with one or more aspects of the present disclosure.

FIG. 2 schematically illustrates various flows of network traffic in an enterprise network (e.g., represented by the distributed computer system 1000 of FIG. 1), in accordance with one or more aspects of the present disclosure. As schematically illustrated by FIG. 2, a malware agent running on a computer system 110 residing on the enterprise network may initiate a callback request to its C2 server residing on the Internet (not shown in FIG. 2). As noted herein above, the Internet-bound traffic within the enterprise network may be handled by one or more instances of the router 130. The router 130 may be configured to forward all proxy-compatible Internet-bound traffic to a proxy server 140. In certain implementations, the router 130 may enforce whitelisting or blacklisting of destination hosts. Whitelisting involves only forwarding to the proxy server 140 the network packets that are addressed to a host referenced by a list of allowed destinations ("white list"). Blacklisting involves forwarding to the proxy server 140 the network packets that are addressed to any host other than the hosts specified by a list of prohibited destinations ("black list").

Thus, the proxy-compatible traffic is routed through the proxy server 140, while all other traffic, i.e., the "default route" traffic, is routed to the intrusion prevention and detection system 160 and/or the C2 server simulator 170. In certain implementations, the intrusion prevention and detection system 160 may operate inline, i.e., the traffic originated by the router 130 may flow through the intrusion prevention and detection system 160 until it finally reaches the C2 server simulator 170. Alternatively, the traffic originated by the router 140 may be forwarded by parallel paths to the intrusion prevention and detection system 160 and the C2 server simulator 170. Alternatively, the traffic originated by the router 140 may be forwarded to the intrusion prevention and detection system 160 or the C2 server simulator 170.

As noted herein above, the intrusion prevention and detection system 160 may implement signature-based and/or statistical methods in order to detect malware activity. The C2 server simulator 170 may respond to callback requests transmitted by a malware agent, such that the malware agent would be led to believe that it has communicated to its C2 server and would thus transmit the collected data and/or request further instructions from the C2 server.

Responsive to detecting malware activity, such as malware agent communications with C2 servers, the intrusion prevention and detection system 160 and/or the C2 server simulator 170 may notify the Security Information and Event Management (SIEM) server 180 and/or other entities (e.g., the security incident response team). The notification may include the network address and other identifying information of the detected malware agent and/or the network address and other identifying information of the C2 server that was the intended recipient of the callback message originated by the malware agent.

Figure 3:
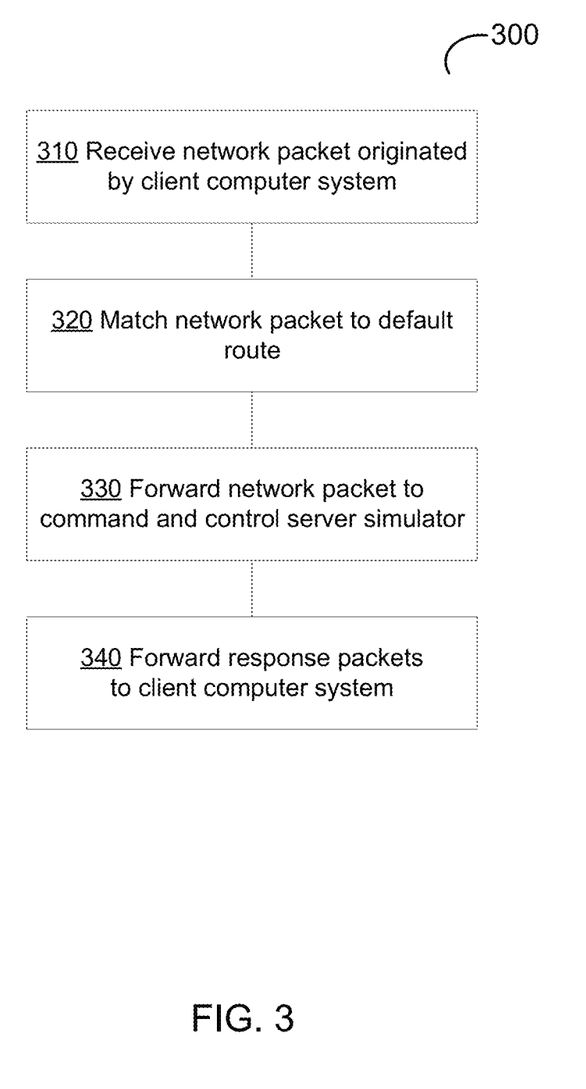
FIG. 3 depicts a flow diagram of an example method for malware detection in distributed computer systems, in accordance with one or more aspects of the present disclosure.

FIG. 3 depicts a flow diagram of an example method 300 for malware detection in distributed computer systems, in accordance with one or more aspects of the present disclosure. Method 300 and/or each of its individual functions, routines, subroutines, or operations may be performed by one or more general purpose and/or specialized processing devices. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by one or more routers 130 of FIG. 1. The network router implementing the method may be provided by an OSI Layer 3 (network layer) router.

Referring to FIG. 3, at block 310, the computer system (e.g., a network router) implementing the method may receive a network packet originated by a client computer system residing on a protected network, as described in more detail herein above.

Responsive to matching, at block 320, the received network packet to the default route, the network router may, at block 330, forward the network packet to a command and control server simulator. In certain implementations, matching the network packet to the default route may involve attempting to match the network packet destination address, port, and/or protocol to one or more routes specified by the router configuration. In an illustrative example, a route may be identified by the destination address, port, and/or protocol and may specify a network interface and a gateway to which the network packets that match the route should be forwarded by the router. Responsive to failing to match a network packet to all the routes defined by the router configuration (except for the default route), the router may assign the packet to the default route. In an illustrative example, one or more non-default routes may instruct the router to route the proxy-compliant traffic to a proxy server. In another illustrative example, one or more non-default routes may instruct the router to route the whitelisted traffic to one of the allowed destinations. In another illustrative example, one or more non-default routes may instruct the router to route the blacklisted traffic to the intrusion prevention and detection system and/or the C2 server simulator. The default route may specify a network interface and a gateway to which the network packets that fail to match all other routes should be forwarded by the router.

At block 340, the network router may forward, to the client computer system running a malware agent, one or more response packets comprising a command and control instruction issued to the client computer system by the C2 server simulator. In certain implementations, the network router may rewrite the source address field of the response packets to match the destination address of the callback request (i.e., the address of the C2 server), as described in more detail herein above.

Figure 4:
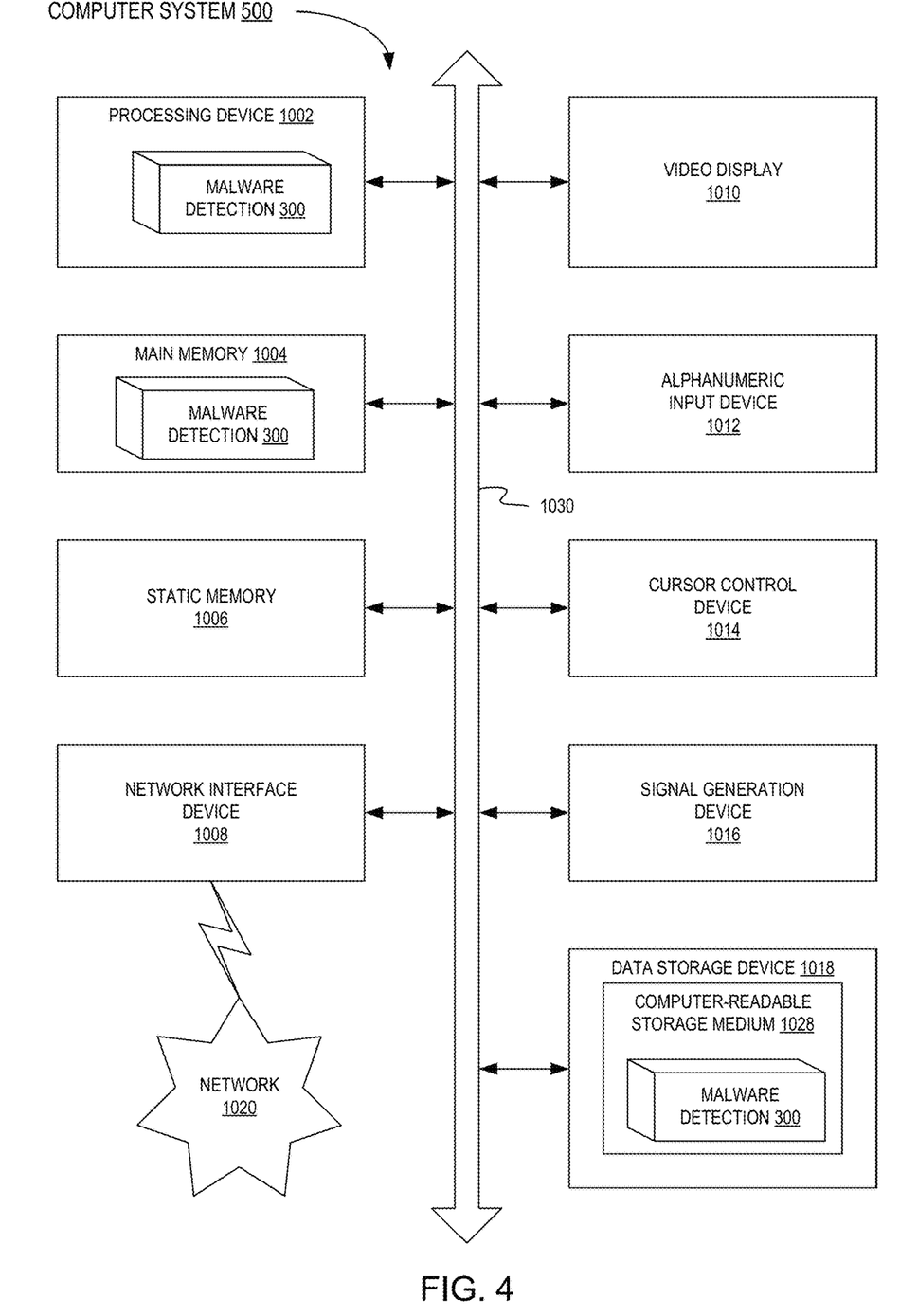
FIG. 4 depicts a block diagram of an illustrative computer system operating in accordance with one or more aspects of the present disclosure.

FIG. 4 illustrates a diagrammatic representation of a computer system 500 within which a set of instructions for causing the computing device to perform the methods discussed herein may be executed. The computer system 500 may be connected to other computing devices in a LAN, an intranet, an extranet, and/or the Internet. The computer system 500 may operate in the capacity of a server machine in a client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may by represented by a network router implementing the above-described method and system 300 for malware detection in distributed computer systems.

The example computer system 500 may include a processing device (e.g., a general purpose processor) 1002, a main memory 1004 (e.g., synchronous dynamic random access memory (DRAM), read-only memory (ROM)), and a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the method 300 for malware detection in distributed computer systems, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 300 for malware detection in distributed computer systems, in accordance with one or more aspects of the present disclosure) implementing any one or more of the methods or functions described herein. Instructions implementing the method and system 300 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods and systems described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
receiving, by a network router, a network packet originated by a client computer;
responsive to failing to match the network packet to a plurality of predetermined routes identified by respective destination addresses, forwarding the network packet to a command and control server simulator; and
forwarding, to the client computer system, one or more response packets comprising a command and control instruction issued to the client computer system by the command and control server simulator; and
responsive to receiving a notification from the command and control server simulator, creating a routing rule causing the network router to discard subsequent network packets addressed to a destination address of the network packet.

2. The method of claim 1, wherein a route of the plurality of predetermined routes identifies a proxy server.

3. The method of claim 1, wherein a route of the plurality of predetermined routes identifies an intrusion prevention and detection system.

4. The method of claim 1, wherein the network router is provided by an Open Systems Interconnection (OSI) layer 3 (network layer) router.

5. The method of claim 1, wherein the network packet is initiated by a malware agent running on the client computer.

6. The method of claim 1, further comprising:
forwarding the network packet originated by the client computer system to a traffic analyzer for detecting malware activity.

7. The method of claim 6, further comprising:
responsive to receiving a notification from the traffic analyzer, creating the routing rule causing the network router to discard subsequent network packets addressed to the destination address of the network packet.

8. The method of claim 1, further comprising:
responsive to determining that the destination address is found in a list of barred destination addresses, forwarding the network packet to the command and control server simulator.

9. A distributed computer system, comprising:
a plurality of client computer systems;
a command and control server simulator; and
a network router, wherein the network router is configured to:
receive a network packet originated by a client computer;
responsive to failing to match the network packet to a plurality of predetermined routes identified by respective destination addresses, forward the network packet to a command and control server simulator; and
forward, to the client computer system, one or more response packets comprising a command and control instruction issued to the client computer system by the command and control server simulator; and
responsive to receiving a notification from the command and control server simulator, create a routing rule causing the network router to discard subsequent network packets addressed to a destination address of the network packet.

10. The distributed computer system of claim 9, wherein a route of the plurality of predetermined routes identifies a proxy server.

11. The distributed computer system of claim 9, wherein the network router is provided by an Open Systems Interconnection (OSI) layer 3 (network layer) router.

12. The distributed computer system of claim 9, wherein the network packet is initiated by a malware agent running on the client computer.

13. The distributed computer system of claim 9, wherein the network router is further configured to:
forward the network packet originated by the client computer system to a traffic analyzer for detecting malware activity.

14. The distributed computer system of claim 13, wherein the network router is further configured to:
responsive to receiving a notification from the traffic analyzer, create the routing rule causing the network router to discard subsequent network packets addressed to the destination address of the network packet.

15. A computer-readable non-transitory storage medium comprising executable instructions that, when executed by a computer system, cause the computer system to:
receive a network packet originated by a client computer;
responsive to failing to match the network packet to a plurality of predetermined routes identified by respective destination addresses, forward the network packet to a command and control server simulator; and
forward, to the client computer system, one or more response packets comprising a command and control instruction issued to the client computer system by the command and control server simulator; and
responsive to receiving a notification from the command and control server simulator, create a routing rule causing the computer system to discard subsequent network packets addressed to a destination address of the network packet.

16. The computer-readable non-transitory storage medium of claim 15, wherein a route of the plurality of predetermined routes identifies a proxy server.

17. The computer-readable non-transitory storage medium of claim 15, wherein the network packet is initiated by a malware agent running on the client computer.

18. The computer-readable non-transitory storage medium of claim 15, further comprising executable instructions that, when executed by the computer system, cause the computer system to:
   forward the network packet originated by the client computer system to a traffic analyzer for detecting malware activity.

19. The computer-readable non-transitory storage medium of claim 18, further comprising executable instructions that, when executed by the computer system, cause the computer system to:
   responsive to receiving a notification from the traffic analyzer, create the routing rule causing the computer system to discard subsequent network packets addressed to the destination address of the network packet.

20. The computer-readable non-transitory storage medium of claim 15, further comprising executable instructions that, when executed by the computer system, cause the computer system to:
   responsive to determining that the destination address is found in a list of barred destination addresses, forwarding the network packet to the command and control server simulator.

* * * * *